W. O. REIM.
Hydrostatic Scales.

No. 98,630.  Patented Jan. 4, 1870.

Witnesses:
Inventor:
Wm Oscar Reim
Attorney.

United States Patent Office.

WILLIAM OSCAR REIM, OF SPRINGFIELD, OHIO.

Letters Patent No. 98,630, dated January 4, 1870.

IMPROVEMENT IN WATER-GAUGE FOR THE TONNAGE OF VESSELS.

The Schedule referred to in these Letters Patent and making part of the same.

To all whom it may concern:

Be it known that I, WILLIAM OSCAR REIM, of Springfield, in the county of Clark, and State of Ohio, have invented a new and useful Improvement in Scales for Weighing Ships' Cargoes; and I do hereby declare that the following is a full, clear, and exact description thereof, reference being had to the accompanying drawing, in which—

Figure 1 is a plan view of a vessel, showing a device for suspending the scale outside the vessel;

Figure 2:
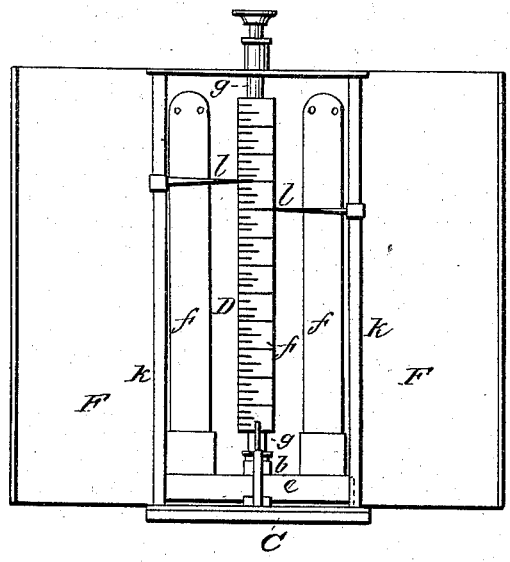
Figure 2 is a front view of the scale, the hinged guards being opened.
Figure 3:
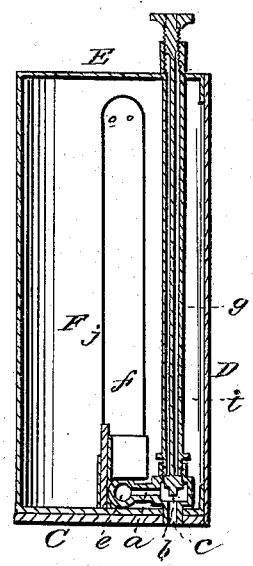
Figure 3 is a vertical section, taken in the line $x\, x$ of fig. 4.
Figure 4:
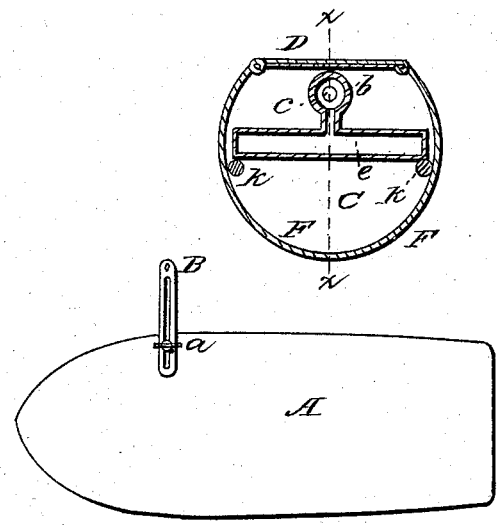
Figure 4 is a transverse section, taken in the line $y\, y$ of fig. 3.

The nature of my invention consists in the peculiar construction and operation of a boat-scale, for ascertaining the weight of a ship's cargo, the construction and operation of which will be hereinafter fully described.

To enable those skilled in the art to make and use my invention, I will proceed to describe its construction and operation.

In the drawing—

A represents the deck of a vessel.

B, a slotted arm, from the outer end of which I suspend the scale in any desired manner. This arm is secured to the vessel by a set-screw, $a$, which passes through the slot in the arm, by means of which the outer end of the arm can be held at any desired distance from the vessel, or the arm, when not in use, can be turned inside of the rail and secured in that position.

The object of making the arm adjustable is, that in case the vessel is tilted, the scale can be suspended far enough from the vessel's side to prevent the two from coming in contact, thereby allowing the scale to hang in a vertical position.

C is the base of the scale, to which the back D is secured.

To the upper end of this back is secured the top E, which is the same form, and placed over the base C.

To the back D is hinged the guard F, which is closed when the measurement is being made, and is intended to protect the glass tubes and other portions of the scale.

$b$ is a valve-chamber, with a tube, $c$, in its lower end, which passes through the base C.

In one of its sides is a tube, $d$, which connects with the horizontal cylinder $e$.

Above this cylinder are two glass tubes $f\, f$, in the upper ends of which are small holes.

Between the cylinder $e$ and these glass tubes are holes, which permit the water to flow from the cylinder into them.

Extending down from the top E is a tube, $g$, the lower end of which is screwed into the top of the valve-chamber $b$.

In the valve-chamber $b$ is a valve, $h$, which is secured to a rod, $i$, on the upper end of which is a male screw, which works in a female screw in the upper end of the tube $g$.

In front of the cylinder $e$, and between the glass tubes $f\,f$, is a gauge, $j$.

$k\, k$ are rods, secured between the base C and top E, and outside the gauge $j$.

On these rods are two hands or points, $l\, l$.

Its operation is as follows:

After the vessel has been loaded, and it is desired to ascertain the weight of the cargo, the arms B are secured in their proper positions, by means of the set-screw $a$, and the scale or scales hung to their outer ends.

As the scale is lowered into the water, it will flow through the tube $c$ into the valve-chamber $b$, thence through the tube $d$ into the cylinder $e$, and thence into the glass tubes $f\, f$, the water rising up to the same level as that outside, thereby indicating on the gauge the displacement of water.

When this has been accomplished, the valve $h$ is locked, by means of the rod $i$ being turned from above, the stem of the valve entering the tube $c$, the shoulder of the valve resting on the bottom of the valve-chamber $b$, which forms the valve-seat, thus locking the valve, and preventing the water in the tubes from escaping.

The scale can now be removed, and one of the hands $l$ adjusted to the height of the water in the tubes.

The valve can now be unlocked, the water allowed to escape, and the scale hung in any other position on the vessel, and the same process repeated, when the difference in the height of the water in the tubes will be seen, and the other hand placed on a line with the level of the water.

When the scales are used in two positions on the vessel, by dividing the difference indicated on the gauge by the two hands by the multiple of two, and subtracting the amount of bilge-water, the weight of the cargo will be ascertained.

Figure 5:
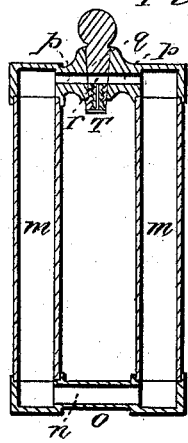
Figure 5 is a central vertical section of the part of the scale for measuring the bilge-water.

Fig. 5 represents an auxiliary device for ascertaining the amount of bilge-water in the vessel.

$m\, m$ are glass tubes, which are connected together at their lower ends, by a horizontal tube, $n$, in the under side of which is an aperture, $o$, and their upper ends are connected by a tube, $p$, near the centre of which is a stop-cock, $q$; and in its lower end is a hole, $r$.

When the scale is placed in the water, the stop-cock $q$ is open, thereby allowing the air in the tubes to escape through the hole $r$ as the water enters through the hole $o$, in the tube $n$.

When the water has reached its greatest height in the tubes $m\ m$, by closing the stop-cock $q$ the water will be retained in its position.

Having thus fully described my invention,

What I claim, and desire to secure by Letters Patent, is—

1. The combination of the valve $h$, valve-chamber $b$, gauge $j$, index-hands $l\ l$, tube $c$, and tubes $f\ f$, when constructed and arranged substantially as shown and described.

2. The combination of the valve $h$, rod $i$, and tube $g$, substantially as shown and described.

3. The combination of the glass tubes $m\ m$, horizontal tubes $n$ and $p$, and the stop-cock $q$, when constructed and arranged substantially as shown and described.

WM. OSCAR REIM.

Witnesses:
G. A. C. SMITH,
E. R. BROWN.